Figure 1:
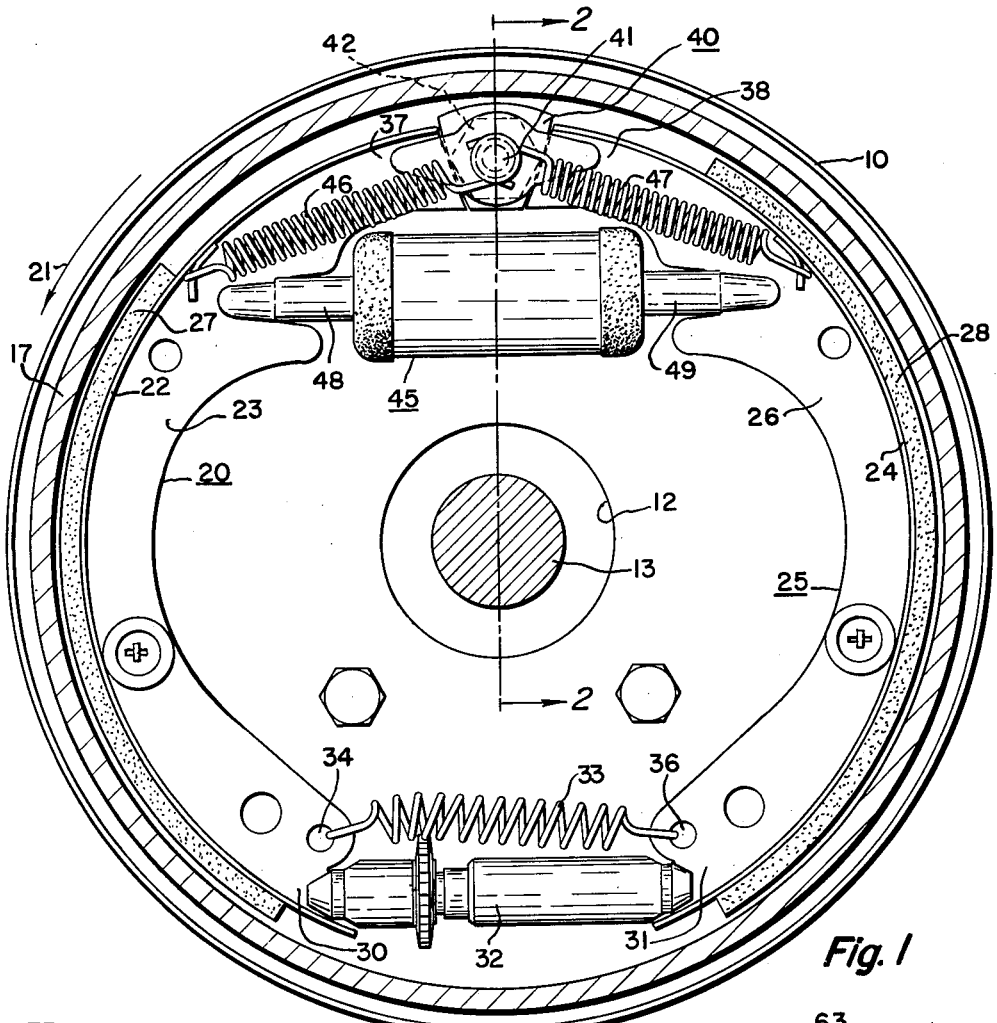

May 28, 1963    E. L. NASH    3,091,308
ANCHOR MEANS FOR BRAKE SHOES
Filed April 18, 1960    2 Sheets-Sheet 1

INVENTOR.
Edward L. Nash
BY
C. L. Staley
His Attorney

May 28, 1963  E. L. NASH  3,091,308
ANCHOR MEANS FOR BRAKE SHOES
Filed April 18, 1960  2 Sheets-Sheet 2

INVENTOR.
Edward L. Nash
BY
D. C. Staley
His Attorney

United States Patent Office
3,091,308
Patented May 28, 1963

3,091,308
ANCHOR MEANS FOR BRAKE SHOES
Edward L. Nash, Ferndale, Mich., assignor to General Motors Corporation, Detroit, Mich., a corporation of Delaware
Filed Apr. 18, 1960, Ser. No. 23,070
9 Claims. (Cl. 188—78)

This invention relates to brakes adapted for use on motor vehicles and particularly to a compound braking mechanism or self-energizing mechanism of the type known as a duo servo brake wherein one brake shoe is energized by torque reaction on the other of a pair of cooperating brake shoes.

It is an object of the present invention to provide a novel brake mechanism which is self-centering in both directions of rotation of the brake drum relative to the stationary elements of the brake mechanism, that is the brake shoes are self-centering relative to the brake drum whether the brake drum is rotating in a forward direction of the vehicle or in a reverse direction of the vehicle.

It is also an object of the present invention to provide a self-energizing or duo servo type brake mechanism that is self-centering when the brake mechanism is in the released or de-energized position to thereby eliminate drag of the brake shoes on the brake drum due to off-center conditions of the brake shoes relative to the brake drum that has been a difficulty in the past in brake mechanisms of this general character.

It is another object of the invention to provide a brake mechanism in which a pair of brake shoes of generally arcuate character are positioned at opposite sides of a single anchor block with the adjacent cooperating ends of the brake shoes in engagement with the anchor block when the brake is in released condition, the surfaces of the anchor block and the surfaces of the ends of the brake shoes that engage the anchor block having a configuration such that the brake shoes engage the opposite faces of the anchor block in substantially a line contact on each of the opposite surfaces of the anchor block when the respective brake shoes engage the anchor block, the cooperating surfaces of the ends of the brake shoes and of the anchor block also having their configuration arranged such that adjacent cooperating surfaces of the shoe ends and the anchor block are continuously diverging in both directions from the line contact established between the shoe ends and the surfaces of the anchor block.

In accomplishing the foregoing objects of the invention, it is another object of the invention to establish the configuration of the adjacent cooperating surfaces of the shoe ends and of the anchor block on different radii so that the surface of the shoe ends are constantly diverging relative to the surface on the anchor block from the line contact of engagement therebetween.

In accomplishing the foregoing object of invention, it is a still further object of the invention to place the radius centers for the adjacent cooperating arcuate surfaces of the anchor block and of the shoe ends on a common radius line that extends through the pivot center for the anchor block, the common radius line on which the radius centers for the arcuate surfaces being disposed substantially 20° angular to a horizontal radius line also extending through the pivot center of the anchor block, the horizontal center line or radius line being horizontal relative to a vertical center line taken through the center of the pivot for the anchor block and the center of the backing plate on which the anchor block is mounted.

Further objects and advantages of the present invention will be apparent from the following description, reference being had to the accompanying drawings wherein a preferred embodiment of the present invention is clearly shown.

Figure 4:
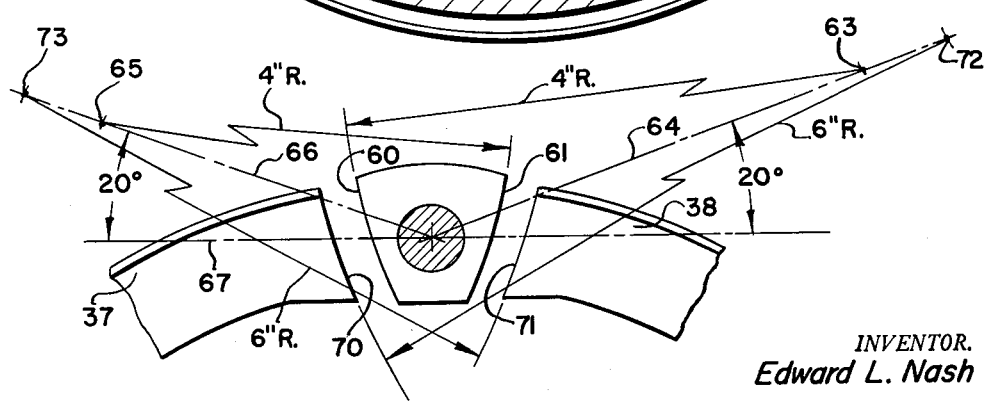
Figure 2:
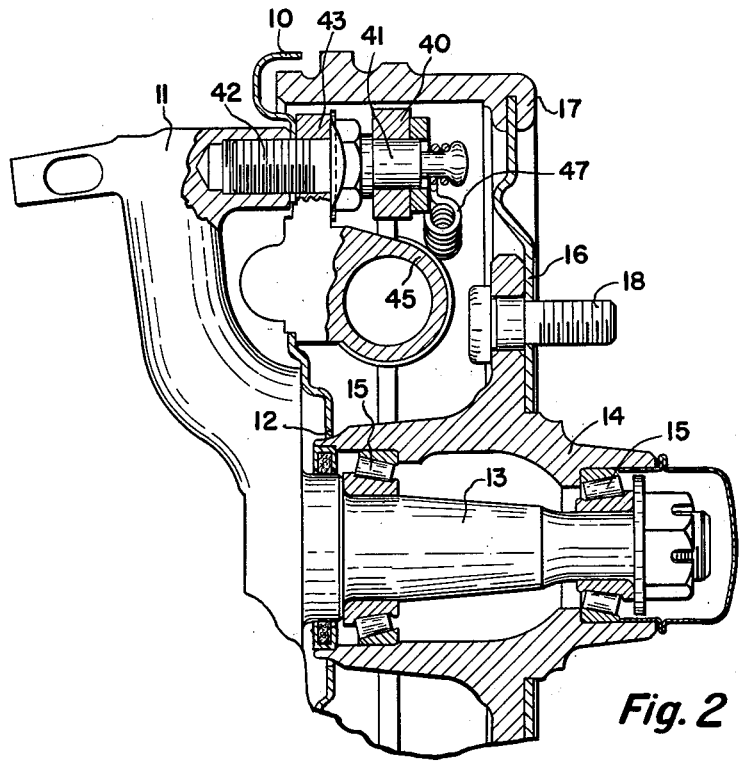
Figure 3:
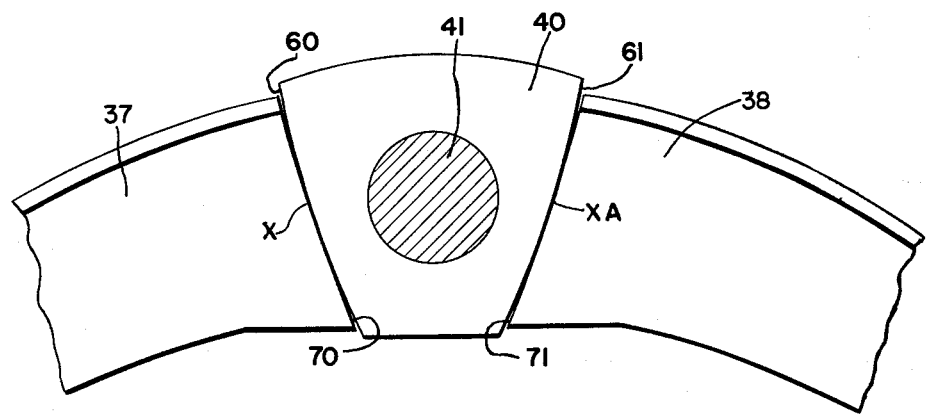

In the drawings:
FIG. 1 is a cross-sectional view of a self-energizing duo servo brake mechanism incorporating features of this invention.
FIG. 2 is a vertical cross-sectional view taken substantially along line 2—2 of FIG. 1.
FIG. 3 is an enlarged cross-sectional view illustrating the anchor block of this invention together with its engagement with the shoe ends cooperating therewith.
FIG. 4 is a schematic view of the anchor block and shoe ends cooperating therewith illustrating the positions of the radius centers for the surfaces of the anchor block and of the brake shoe ends cooperating therewith.

In this invention the brake structure is illustrated as that provided for the front wheel of a vehicle. However, the feature of invention concerning the anchor block is applicable to the rear brake structure as well as the front wheel brake structure.

In the brake structure illustrated on the drawings, there is included a backing plate 10 supported on the steering knuckle 11 of the vehicle, the backing plate having a central opening 12 through which the wheel axle 13 extends. The wheel axle 13 carries the wheel hub 14 on the anti-friction bearings 15, the wheel flange 16 terminating in a brake drum 17 that preferably consists of a ring cast onto the wheel flange 16. The wheel flange 16 carries the studs 18 on which the wheel of the vehicle is secured to the brake drum.

The brake mechanism consists of a pair of arcuately shaped brake shoes 20 and 25 which provide the primary and secondary brake shoes respectively as a duo servo type brake mechanism, considering the direction of rotation of the drum 17 being counterclockwise in the direction of the arrow 21. The brake shoe 20 consists of an arcuately shaped flange 22 reinforced by a web number 23 extending normal to the shoe flange 22 and relative to the same to provide an integral structure. Similarly, the brake shoe 25 consists of a shoe flange 24 secured to a web 26. The brake shoe 20 carries the brake lining element 27 while the brake shoe 25 carries the brake lining element 28.

The brake shoes 20 and 25 have adjacent cooperating ends 30 and 31 respectively engaging opposite ends of an adjusting device 32 that spaces the ends of the shoes relative to one another and provides for adjustment of the clearance between the lining elements 27 and 28 and the brake drum 17. A tension spring 33 extends between the openings 34 and 36 in the brake shoe ends 30 and 31 respectively to retain the brake shoe ends against the adjusting device 32.

The opposite adjacent ends 37 and 38 of the brake shoes 20 and 25, respectively, engage an anchor block 40 that is rotatively and pivotly supported on the anchor pin 41. The anchor pin 41 is secured to the backing plate 10 by means of the headed stud end 42 that threads into the steering knuckle 11 and secures the backing plate 10 between the steering knuckle and the flange 43 on the hydraulic wheel cylinder 45 that actuates the brake shoes relative to the brake drum 17. The retraction springs 46 and 47 extend between the brake shoes 20 and 25 respectively and the anchor pin 41 to retain the adjacent opposite ends 37 and 38 of the brake shoes 20 and 25 respectively in engagement with the anchor block 40 when the brake mechanism is in the released or retracted condition as shown in FIG. 1 of the drawing.

The wheel cylinder 45 contains the conventional wheel cylinder pistons therein having plunger ends 48 and 49 extending respectively into engagement with the brake shoes 20 and 25 to expand the brake shoes into engagement with the brake drum when hydraulic fluid under pressure is supplied to the wheel cylinder 45 from the master cylinder (not shown) on the vehicle.

As shown more specifically in FIGS. 3 and 4, the anchor block 40 that is carried rotatively and pivotly on the anchor pin 41 is provided with arcuate or rounded surfaces 60 and 61 on each of opposite faces of the anchor block 40. The arcuate face 60 of the anchor block 40 is formed in the configuration of an arc of a circle having the radius center 63 positioned on a radius line 64 that extends from the center of the anchor pivot pin 41 toward the right-hand side of the anchor block, as viewed in FIG. 4. Similarly, the arcuate or rounded surface 61 on the anchor block 40 is formed in the configuration of an arc of a circle having its radius center 65 provided on a radius line 66 that extends from the center of the anchor pivot pin 41 to the left-hand side of the anchor block, viewed in FIG. 4. These two radius lines 64 and 66 are disposed upwardly relative to a horizontal radius line 67 also taken through the center of the pivot pin 41 for the anchor block 40, the radius line 67 being horizontal relative to a center line taken through the center of the pivot pin 41 and the center of the backing plate 10. Thus, the arcuate surfaces 60 and 61 of the anchor block 40 tend to form the anchor block in the shape of a keystone or triangularly shaped element having arcuate oppositely disposed faces 60 and 61 that are of identical configuration since the radius center for the arcuate surfaces 60 and 61 are of identical length relative to the center of the anchor pin 41.

The adjacent cooperating ends 37 and 38 of the brake shoes 20 and 25 respectively are also each provided with rounded or arcuate surfaces 70 and 71 respectively. The arcuate surfaces 70 and 71 are formed on the webs at their ends of the respective webs 23 and 26.

The arcuate surface 70 of the brake shoe end 37 is formed on the configuration of an arc of a circle that has its radius center on the radius line 64 that also has the radius center 63 for the arcuate surface 60 of the anchor block 40. However, the radius of the arcuate surface 70 is greater than the radius for the arcuate surface 60. Thus, as illustrated in the enlarged drawing of FIG. 3, when the arcuate surface 70 engages the arcuate surface 60, the engagement is by way of a line contact such as that occurring at the line of engagement X.

The arcuately rounded surface 71 of the brake shoe end 38 is in the configuration of the arc a segment of a circle having its radius center 73 on the same radius line 66 on which the radius center 65 is provided for the arcuate surface 61 on the anchor block 40. However, the radius for the arcuate surface 71 is substantially greater than the radius for the arcuate surface 61 but here again the engaging contact between the surfaces 61 and 71 is in the form of a line contact XA. Also, the radius for the surfaces 70 and 71 are identical so that the surfaces 70 and 71 have exactly the same configuration.

As will be apparent from the drawings, the arcuate surfaces 60 and 61 are in the form of convex surfaces on the anchor block 40 while the surfaces 70 and 71 on the brake shoe ends 37 and 38 are concave surfaces.

In the operation of the brake mechanism, assuming the direction of rotation of the brake drum to be counterclockwise, that is in the direction of the arrow 21 on FIG. 1, when fluid under pressure is delivered into the wheel cylinder 45, the brake shoes 20 and 25 will be expanded radially until the brake linings 27 and 28 engage the brake drum. At this time the ends 70 and 71 of the brake shoes may both leave their engagement with the anchor block 40, but this will only be until the brake linings engage the brake drum, at which time the brake shoes will be rotated in a counterclockwise direction by the brake drum to bring the end 38 of the brake shoe 25 into engagement with the anchor block 40, the end 37 of brake shoe 20 remaining out of engagement with the anchor block.

When the surface 71 of the shoe end 38 engages the surface 61 of the anchor block 40, the line contact XA between the surfaces will allow for shifting of the brake shoes relative to the brake drum to center the brake shoes and thereby provide for more even and uniform engagement of the brake shoes with the brake drum. Since the surface 71 of the brake shoe end 38 is continuously divergent relative to the surface 61, obviously the surface 71 can move up and down on the surface 61 readily to allow for self-centering of the brake shoes relative to the brake drum during engagement of the shoes with the brake drum. This self-centering of the brake shoes provides for a reduced sensitivity to variations in the position of the anchor pin 41 from the center of the brake since the brake shoes can automatically find their self-centering position relative to the brake drum. Also this provides for a smoother operating brake since there will be more uniform surface contact with the brake drum by the self-centering action of the brake shoes than would occur if the brake shoes could not self-center themselves during the brake operation.

Similarly, in a reverse brake operation, that is when the vehicle is moving in a reverse direction and a brake operation is occasioned, a clockwise rotation of the brake drum 17 will cause the surface 70 of the brake shoe end 37 to engage the surface 60 of the anchor block 40 and provide for self-centering of the brake shoes in the same manner as heretofore described.

When the brake mechanism is in the retracted position shown in FIG. 1, both surfaces 70 and 71 of the brake shoe ends 37 and 38 are in engagement with their respective cooperating surfaces 60 and 61 respectively on the anchor block 40. With the brake shoe ends engaging the anchor block by line contacts X and XA respectively, it is apparent that the brake shoe assembly can easily pivot about the anchor block 40 on the line contact between the respective surfaces, the line contact changing, of course, as the brake shoe assembly pivots about the anchor block so that the brake shoe assembly can self-center itself relative to the brake drum and thereby reduce or eliminate dragging of the brake linings on the brake drum at times when the brake is in the released condition. Also the pivotal rotation of the anchor block 40 aids in this purpose. Further, since when the line contact is provided between the brake shoe ends and the anchor block, the brake shoes can slide vertically relative to the anchor block and thereby establish a desirable self-centering effect of the brake shoe assembly in the relaxed or retracted condition.

In FIG. 4 the radius lines 64 and 66 on which the radius centers for the surfaces 60 and 70 and 61 and 71 are placed are indicated as being 20° upwardly from the horizontal radius line 67. It has been found that the 20° angle for the radius lines 64 and 66 represents an optimum commercial arrangement for shaping the anchor block 40 to obtain satisfactory self-centering properties of the brake shoe assembly as well as reduce the lockup characteristics of the brakes and obtain smoother brake application that is more proportional to output.

However, while the 20° angle placement of the radius lines 64 and 66 is that most favorable for a good commercial arrangement of the structure, yet the placement angle of the radius lines 64 and 66 can be varied from that shown on FIG. 4 of the drawings and still obtain reasonably satisfactory operation of the brake assembly. The angle of placement can vary approximately 10° in either direction from that shown on the drawing and still obtain reasonably satisfactory operation of the brake assembly.

While the embodiment of the present invention as herein disclosed constitutes a preferred form, it is to be understood that other forms might be adopted.

What is claimed is as follows:

1. In a brake mechanism, the combination of, a backing plate, a plurality of brake shoes for cooperation with a brake drum slidably supported on said backing plate, means connecting adjacent ends of the brake shoes at one end thereof, fluid motor means for moving the brake shoes into engagement with a brake drum, rotatable anchor means between opposite adjacent ends of the brake shoes and carried by said backing plate, and resilient means normally holding said opposite ends of said brake shoes in engagement with said anchor means, said anchor means having rounded surfaces on each of opposite sides thereof engaged by the said opposite ends of said brake shoes, the said opposite ends of said brake shoes each having a rounded surface engageable with one of said rounded surfaces on said anchor means and continuously divergent therefrom from a line of contact therebetween.

2. In a brake mechanism, the combination of, a backing plate, a plurality of brake shoes for cooperation with a brake drum slidably supported on said backing plate, means connecting adjacent ends of the shoes at one end thereof, fluid motor means for moving the brake shoes into engagement with a brake drum, rotatable anchor means between opposite adjacent ends of the brake shoes and carried by said backing plate, and resilient means normally holding said opposite ends of said brake shoes in engagement with said anchor means, said anchor means having arcuate surfaces on each of opposite sides thereof engaged by the said opposite ends of said brake shoes, the said opposite ends of said brake shoes each having an arcuate surface engageable with one of said arcuate surfaces on said anchor means and of a different radius than the anchor surface engaged thereby for continuous divergence therefrom from a line of contact therebetween.

3. In a brake mechanism, the combination of, a backing plate, a plurality of brake shoes for cooperation with a brake drum slidably supported on said backing plate, means connecting adjacent ends of the brake shoes at one end thereof, fluid motor means for moving the brake shoes into engagement with a brake drum, rotatable anchor means between opposite adjacent ends of the brake shoes and carried by said backing plate, and resilient means normally holding said opposite ends of said brake shoes in engagement with said anchor means, said anchor means having rounded surfaces of identical configuration on each of opposite sides thereof engaged by the said opposite ends of said brake shoes, the said opposite ends of said brake shoes each having a rounded surface thereon identical with that on the other of the said shoes engageable with one of said rounded surfaces on said anchor means and of different configuration from the rounded surface on said anchor means for continuous divergence therefrom from a line of contact therebetween.

4. In a brake mechanism, a backing plate, a pair of symmetrical brake shoes engageable with a brake drum, adjusting means connecting adjacent cooperating ends of said brake shoes, means for actuating said brake shoes into engagement with a brake drum, anchor means for said brake shoes comprising an anchor block rotatively mounted on an anchor pin supported on said backing plate, said anchor block having arcuately contoured convex surfaces of identical configuration on each of opposite surfaces thereof for operable engagement by the free cooperating adjacent opposite ends of said brake shoes, the said opposite ends of said brake shoes each having an arcuately concave surface engageable with one of said convex surfaces on said anchor block, said concave surfaces on said opposite ends of said brake shoes having a different radius than the convex surfaces on said anchor block and continuously divergent therefrom from a line of contact between the shoes and the anchor block.

5. In a brake mechanism, a backing plate, a pair of symmetrical brake shoes engageable with a brake drum, adjusting means connecting adjacent cooperating ends of said brake shoes, means for actuating said brake shoes into engagement with a brake drum, anchor means for said brake shoes comprising an anchor block rotatively mounted on an anchor pin supported on said backing plate, said anchor block having convexly extending surfaces on each of opposite sides of said anchor block and having substantially the same radius arc engaged by opposite adjacent ends of said brake shoes, the said opposite ends of said brake shoes each having a concavely extending surface engageable with one of said convexly extending surfaces on said anchor means, said concavely extending surfaces on each of said opposite ends of said brake shoes having substantially the same radius of curvature and different from the radius of curvature of said convexly extending surfaces of said anchor block and greater than the same to provide thereby divergently extending surfaces.

6. In a brake mechanism, a backing plate, a pair of symmetrical brake shoes engageable with a brake drum, adjusting means for connecting adjacent cooperating ends of said brake shoes, means for actuating said brake shoes into engagement with a brake drum, anchor means for said brake shoes comprising an anchor block rotatably mounted on an anchor pin supported on said backing plate, said anchor block having convexly extending arcuate surfaces of identical configuration formed on each of opposite sides of said anchor block for operable engagement by adjacent cooperating free ends of said brake shoes, said free ends of said brake shoes each having a concavely extending arcuate surface, the said concavely extending surfaces having identical configuration, said concavely extending surfaces on said opposite ends of said brake shoes engaging said convexly extending surfaces on said anchor block, said concavely extending and said convexly extending surfaces being of different radii to provide thereby for continuously divergently extending surfaces therebetween from a line of contact between adjacent convex and concave surfaces.

7. A brake mechanism constructed and arranged in accordance with claim 6 wherein the radius of the said concave and the said convex surfaces is on the same radius line extending from the center of the pivot pin on which said anchor block is supported.

8. A brake mechanism constructed and arranged in accordance with claim 6 wherein the radius of the said concave and the said convex surfaces is on the same radius line extending from the center of the pivot pin on which said anchor block is supported, the said radius line being projected at an angle on the order of 20° upwardly from the horizontal radius line also extending through the center of the pivot pin supporting said anchor block.

9. A brake mechanism constructed and arranged in accordance with claim 6 wherein the radius of the said concave and the said convex surfaces is on the same radius line extending from the center of the pivot pin on which said anchor block is supported and the radius of said concave surfaces is greater than the radius of the said convex surfaces.

References Cited in the file of this patent
UNITED STATES PATENTS

| | | |
|---|---|---|
| 2,060,874 | LaBrie | Nov. 17, 1936 |
| 2,755,889 | Schnell | July 24, 1956 |
| 2,885,035 | Rubly | May 5, 1959 |